(12) United States Patent
Pfaff et al.

(10) Patent No.: US 12,071,052 B2
(45) Date of Patent: *Aug. 27, 2024

(54) AIR CONDITIONING DEVICE FOR AN AIR FLOW

(71) Applicant: GENTHERM GMBH, Odeizhausen (DE)

(72) Inventors: Jochen Pfaff, Eching/Dietersheim (DE); Alexander Rappl, Königsbrunn (DE)

(73) Assignee: Gentherm GMBH, Odelzhausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,966

(22) Filed: Apr. 3, 2023

(65) Prior Publication Data
US 2023/0234485 A1    Jul. 27, 2023

Related U.S. Application Data

(63) Continuation of application No. 17/440,491, filed as application No. PCT/DE2020/000065 on Mar. 19, 2020, now Pat. No. 11,673,495.

(30) Foreign Application Priority Data

Mar. 29, 2019 (DE) ..................... 10 2019 002 315.3

(51) Int. Cl.
*B60N 2/56* (2006.01)
*B60N 2/879* (2018.01)
*F24H 3/04* (2022.01)

(52) U.S. Cl.
CPC ........... *B60N 2/5635* (2013.01); *B60N 2/565* (2013.01); *B60N 2/5657* (2013.01); *B60N 2/879* (2018.02)

(58) Field of Classification Search
CPC .. B60N 2/5635; B60N 2/5657; B60N 2/5685; A47C 7/14; A47C 7/748; B60H 1/00285
See application file for complete search history.

(56) References Cited

U.S. PATENT DOCUMENTS 6,170,274 B1    1/2001  Ichishi et al.
6,347,987 B1    2/2002  Ichishi et al.
(Continued)

FOREIGN PATENT DOCUMENTS

DE    102008052019 A1    6/2009
DE    102013012033 A1    1/2014

OTHER PUBLICATIONS

International Search Report and Written Opinion for International Application PCT/DE2020/000065, dated Sep. 7, 2020.

*Primary Examiner* — Shin H Kim
(74) *Attorney, Agent, or Firm* — The Dobrusin Law Firm, P.C.

(57) ABSTRACT

An air conditioning device for a vehicle seat, the air conditioning device includes: at least one flow generator to generate an air flow; at least one air inlet opening fluidically connected to a flow inlet of the flow generator to draw in air to be temperature-controlled; at least one air outlet opening fluidically connected to a flow outlet of the flow generator to eject the temperature-controlled air; a temperature-control device configured to control a temperature of the air drawn in through the at least one air inlet opening prior to the air being ejected from the at least one air outlet opening; and a temperature sensor configured to detect a temperature of the air drawn into the at least one air inlet opening and to adapt a heating power of the temperature-control device to the detected temperature of the drawn-in air.

16 Claims, 5 Drawing Sheets

(56) References Cited

U.S. PATENT DOCUMENTS

| | | |
|---|---|---|
| 7,591,507 B2 | 9/2009 | Giffin et al. |
| 7,753,440 B2 | 7/2010 | Zeyen et al. |
| 8,752,892 B2 | 6/2014 | Sahashi |
| 9,333,888 B2 | 5/2016 | Helmenstein |
| 9,346,384 B2 | 5/2016 | Zhang et al. |
| 10,071,612 B2 | 9/2018 | Thomas |
| 10,240,607 B2 | 3/2019 | Wheeler et al. |
| 10,926,677 B2 * | 2/2021 | Rappl .................. B60N 2/5671 |
| 11,673,495 B2 * | 6/2023 | Pfaff .................... B60N 2/5657 |
| | | 297/180.14 |
| 2003/0132650 A1 | 7/2003 | Bargheer et al. |
| 2007/0278835 A1 | 12/2007 | Bargheer et al. |
| 2008/0129090 A1 | 6/2008 | Zeyen et al. |
| 2008/0248736 A1 | 10/2008 | Aoki et al. |
| 2009/0134677 A1 | 5/2009 | Maly et al. |
| 2014/0159442 A1 | 6/2014 | Helmenstein |
| 2015/0183348 A1 | 7/2015 | Zhang et al. |
| 2016/0052362 A1 | 2/2016 | Thomas |
| 2016/0214514 A1 | 7/2016 | Helmenstein |
| 2020/0039322 A1 | 2/2020 | Soto Infante |
| 2022/0176855 A1 * | 6/2022 | Pfaff ...................... B60N 2/565 |
| 2023/0234485 A1 * | 7/2023 | Pfaff .................... B60N 2/5657 |
| | | 297/180.14 |

\* cited by examiner

AIR CONDITIONING DEVICE FOR AN AIR FLOW

PRIORITY

This application is a continuation of U.S. Ser. No. 17/440,491 filed on Sep. 17, 2021, which is a US National Stage Entry under 35 U.S.C. § 371 of PCT Application Number PCT/DE2020/000065 filed on Mar. 19, 2020, which claims the benefit of DE 102019002315.3 filed on Mar. 29, 2019, all of which are hereby incorporated by reference herein for all purposes.

FIELD

These teachings relate to an air conditioning device for a vehicle seat.

BACKGROUND

Generic air conditioning devices are used, for example, for warming or heating or for cooling air flows, which are then ejected in the direction of a person. The air-conditioned air flow is intended to induce a comfortable temperature sensation in the person.

If appropriate air conditioning devices are used in combination with a vehicle seat, the temperature-controlled air flow is intended to increase climate comfort in the vicinity of the vehicle seat. For example, appropriate air conditioning devices can be used to eject a temperature-controlled air flow in the direction of a neck area of the seat user. This ensures considerable increase in comfort, particularly with convertible vehicles.

Air conditioning devices designed as neck warmers are known. In the prior art, which devices draw in cold air from the environment, wherein the cold air is then heated from the ambient temperature to the desired target temperature by the air conditioning device.

So that the air, which is temperature-controlled by the temperature-control device of the air conditioning device, is not cooled down again by the cold air flow drawn in before it reaches the user, the air inlet opening of known air conditioning devices is usually arranged away from the air outlet opening such that heat exchange between the drawn-in air flow and the ejected air flow is avoided.

The known air conditioning devices often have a complex construction and a large number of parts due to the complex air guidance. Furthermore, the effective temperature-control surface or the effective temperature control range of the ejected temperature-controlled air is comparatively small, since in known air conditioning devices, an air flow is ejected with a comparatively small flow cross-section.

SUMMARY

The object on which the invention is based is thus to improve the effectiveness of corresponding air conditioning devices without thereby increasing the complexity of the equipment and/or increasing the number of parts required.

The object is achieved by an air conditioning device of the type mentioned at the outset, wherein the at least one air inlet opening and the at least one air outlet opening of the air conditioning device according to the invention are arranged next to one another, particularly directly next to one another.

These teachings relate to an air conditioning device having at least one flow generator, which is configured to generate an air flow, at least one air inlet opening which is fluidically connected to a flow inlet of the flow generator to draw in air to be temperature-controlled, at least one air outlet opening which is fluidically connected to a flow outlet of the flow generator in order to eject temperature-controlled air, and a temperature-control device which is configured to control the temperature of the air drawn in through the at least one air inlet opening prior to the ejection thereof through the at least one air outlet opening.

The invention further relates to a support device for a vehicle seat, having a preferably padded support body, which has a support surface for the back and/or back of the head of a user, and an air conditioning device to draw in, control the temperature of and eject an air flow, wherein the air conditioning device is arranged within the support body.

In addition, the invention relates to a vehicle seat having a, preferably padded, buttocks receiving body, which provides a seat surface for a user, and a support device for supporting the back and/or the head of the user.

Such an arrangement of the at least one air inlet opening and the at least one air outlet opening allows pre-temperature-controlled air to be drawn in through the at least one air inlet opening, wherein the pre-temperature-controlled air has previously been ejected through the at least one air outlet opening. In this way, the temperature-controlled air is reused or used for multiple purposes, so that heat recuperation is implemented. This allows more efficient and faster temperature control of the air, since the temperature change to be implemented by the air conditioning device is reduced. The temperature control of ambient air, which has the ambient temperature, requires a higher energy input and a longer temperature-control time compared to the temperature control of already pre-temperature-controlled air. The temperature control can relate to the warming or heating or cooling of the air within the air conditioning device. In addition, the arrangement according to the invention of the at least one air inlet opening and the at least one air outlet opening results in a spreading out or widening of the outflow angle, since a turbulence effect in the transition region between the at least one air inlet opening and the at least one air outlet opening leads to an outward deflection of the ejected temperature-controlled air. The effective temperature control range of the air conditioning device is thus also enlarged.

The air supply to and/or the air discharge from the flow generator can take place, for example, through air ducts. Alternatively or additionally, the air supply to and/or the air discharge from the flow generator can be implemented at least partially through the structure of the body surrounding the air conditioning device. The temperature-control device can comprise one or more electrical heating elements. The temperature-control device particularly comprises one or more PTC heating elements, one or more electrical heating foils, one or more resistance heating wires and/or one or more infrared radiators. The one or the plurality of heating foils can be printed, electrically conductive heating foils. The resistance heating wires can be linear or spiral-shaped resistance heating wires. Alternatively or additionally, the temperature-control device can comprise one or more thermoelectric devices. The one or the plurality of thermoelectric devices can be designed as Peltier elements. The flow generator can be designed as a fan. The flow generator is particularly designed as a radial fan.

In a preferred embodiment, the air conditioning device according to the invention has an, particularly one-piece, air routing body which comprises the at least one air inlet opening and the at least one air outlet opening. The at least one air inlet opening and the at least one air outlet opening are preferably located in a common air flow plane. The air routing body is preferably configured to be inserted into a support device of a vehicle seat, for example, in a headrest or a backrest of a vehicle seat, or to be fastened to the support device. A screen which encloses the at least one air inlet opening and the at least one air outlet opening can be arranged on the air routing body. The screen can be connected to the air routing body. For example, the screen is fastened to the air routing body. Alternatively, the air routing body and the screen can be integral components of a one-piece body. The air routing body and/or the screen are preferably made of plastic. The air routing body and/or the screen can, for example, be a plastic injection-molded part.

In another preferred embodiment of the air conditioning device according to the invention, the at least one air inlet opening and the at least one air outlet opening form a common air passage opening. The common air passage opening is thus a combined air inlet and air outlet opening. The common air passage opening prevents the at least one air inlet opening and the at least one air outlet opening from being formed separately from one another, which would result in a high level of device complexity and would require a high number of parts. The common air passage opening thus leads to a structurally simple, compact and lightweight air conditioning device. A saving in weight and installation space can thus be implemented.

In a further preferred embodiment of the air conditioning device according to the invention, an inlet flow region directly adjoining the at least one air inlet opening runs separately from an outlet flow region to which the at least one air outlet opening adjoins directly. By separating the inlet flow region and the outlet flow region, an exchange of fluid between the air flow to be temperature-controlled and the temperature-controlled air flow within the air conditioning device is avoided. A corresponding exchange of fluid, which also leads to a heat exchange between the air flow to be temperature-controlled and the temperature-controlled air flow, takes place only outside the air conditioning device, so that the air drawn in through the at least one air inlet opening is already pre-temperature-controlled. The separation of the inlet flow region from the outlet flow region also leads to a reduction or avoidance of a heat exchange between the air flow to be temperature-controlled and the temperature-controlled air flow within the air conditioning device.

In a further development of the air conditioning device according to the invention, the outlet flow region has a free flow cross-section that increases in the flow direction of the temperature-controlled air. The outlet flow region can, for example, be funnel-shaped or frustoconical. Due to the increasing free flow cross-section of the outlet flow region, the effective temperature control region outside the air conditioning device is increased, since the temperature-controlled air flow spreads out laterally through the at least one air outlet opening after leaving the air conditioning device. For example, comprehensive temperature control of the neck region of a seat user can thus be implemented. The spreading out of the ejected air flow also leads to increased temperature uniformity, which is perceived by a seat user as increasing comfort.

In another preferred embodiment of the air conditioning device according to the invention, the outlet flow region is delimited by lateral wall surfaces, wherein two opposite wall surfaces diverge in the flow direction of the temperature-controlled air and are arranged at a spread angle to one another. The spread angle can, for example, be in an angular range between 0 and 60 degrees, particularly between 0 and 15 degrees. Because the two opposite wall surfaces diverge in the flow direction of the temperature-controlled air, the ejected temperature-controlled air is spread apart, so that the region outside the air conditioning device through which the temperature-controlled air flow flows is considerably enlarged.

In a further development, the air conditioning device according to the invention has at least two inlet flow regions, wherein the outlet flow region is arranged between the two inlet flow regions. The two inlet flow regions are preferably arranged in the vertical and/or horizontal direction on the outside of the outlet flow region. One inlet flow region is preferably arranged to the side, particularly to the left and right, of the outlet flow region. Alternatively or additionally, an inlet flow region is arranged above and/or an inlet flow region is arranged below the outlet flow region. The air conditioning device preferably has at least two air inlet openings, wherein the air outlet opening is arranged between the two air inlet openings. The two air inlet openings are preferably arranged on the outside of the air outlet opening in the vertical and/or horizontal direction. An air inlet opening is preferably arranged to the side, particularly to the left and right, of the air outlet opening. Alternatively or additionally, an air inlet opening is arranged above and/or an air inlet opening below the air outlet opening. The at least two air inlet openings result in at least two transition regions in which a fluid and heat exchange between an inlet air flow and an outlet air flow is implemented outside the air conditioning device. In addition, at least two air turbulence regions are formed in the boundary region between the air inlet openings connected to the inlet flow regions and the air outlet opening connected to the outlet flow region.

In a further preferred embodiment, the air conditioning device according to the invention has a guide grille body. The guide grille body comprises a plurality of air guide elements which form a lattice structure and are configured to influence the flow direction of the air flow within the air routing body and/or the flow direction of the air flow out of the air routing body. The lattice structure is preferably formed by a plurality of air guide elements that run parallel to one another and/or at an angle to one another. The guide grille body preferably has a first group of air guide elements that run parallel to one another and are arranged spaced apart from one another and a second group of air guide elements that run parallel to one another and are arranged spaced apart from one another, wherein the air guide elements of the first group and the air guide elements of the second groups are angled to one another, particularly are arranged at right angles to one another. The guide grille body can be connected to the air routing body and/or inserted into the air routing body. For example, the guide grille body is fastened to the air routing body. Alternatively, the air routing body and the guide grille body can be integral components of a one-piece body. The guide grille body is preferably made of plastic. The guide grille body can, for example, be a plastic injection-molded part.

In another preferred embodiment of the air conditioning device according to the invention, the guide grille body is arranged in the outlet flow region and/or in the inlet flow region and preferably in the vicinity of the at least one air outlet opening and/or the at least one air inlet opening, wherein the air guide elements are preferably fan-like arranged air guide blades. The air guide blades can each have orientations that deviate from one another, particularly deviating blade angles. Individual or all of the air guide blades can extend both through the outlet flow region and through the inlet flow region. The guide grille body can have a first group of air guide blades and a second group of air guide blades. The air guide blades of the first group can be aligned essentially vertically, wherein the air guide blades of the second group can be aligned essentially horizontally. In the vertical or horizontal orientation, the air guide blades can have different horizontal or vertical blade angles. A horizontal and/or vertical spreading out of the flow can be achieved by means of the air guide blades. The air guide blades can be fastened immovably and/or rigidly. Alternatively, the air guide blades can also be movable, particularly with regard to their blade angle. The flow direction of the ejected temperature-controlled air can be influenced by changing the blade angle of the air guide blades by movable air guide blades.

In addition, an air conditioning device according to the invention is advantageous in which the at least one air inlet opening and the flow generator are connected via one or more inlet flow channels. The flow generator and the at least one air outlet opening are preferably connected via one or more outlet flow channels. The one or the plurality of inlet flow channels and the one or the plurality of outlet flow channels can be formed separately from one another and/or arranged adjacent to one another. Separating lamellae, which separate the inlet and outlet flows from one another within the air routing body, are preferably arranged between the one or the plurality of inlet flow channels and the one or the plurality of outlet flow channels. The separating lamellae preferably carry the lateral wall surfaces which laterally delimit the outlet flow region.

In another preferred embodiment of the air conditioning device according to the invention, the air routing body comprises the one or the plurality of inlet flow channels, the one or the plurality of outlet flow channels, the one or the two inlet flow regions and/or the outlet flow region. Thus, the air guidance in front of and behind the flow generator and the temperature-control device is essentially completely implemented by the air routing body.

In addition, an air conditioning device according to the invention is preferred in which the flow generator and the temperature-control device have a common fan housing, wherein the air routing body preferably is fastened to the fan housing. The air conditioning device is thus of modular design, so that the operating properties of the air conditioning device can be changed by replacing the fan housing comprising the flow generator and the temperature-control device and/or by replacing the air routing body. The modular structure results in a low system complexity. There is also a significant reduction in the number of parts. In addition, the manufacturing and assembly costs are significantly reduced.

In a further development of the air conditioning device according to the invention, the at least one air inlet opening and the at least one air outlet opening are arranged next to one another such that, during operation of the air conditioning device outside the air conditioning device, in the transition region between the at least one air inlet opening and the at least one air outlet opening, an air turbulence is formed, which deflects ejected air to the outside through the at least one air outlet opening. The outflow angle of the temperature-controlled air is thus increased further. This ultimately leads to an enlargement of the effective temperature control range of the air conditioning device, as a result of which, for example, a uniform and comprehensive warming of the neck of a seat user can be realized.

The air conditioning device according to the invention can furthermore have a temperature sensor which is configured to detect the temperature of the air flow drawn in through the at least one air inlet opening. The temperature sensor can be used to measure the inlet temperature of the inflowing air. The input temperature measurement can be used to adapt the heating power of the temperature-control device to the detected temperature of the drawn-in air. The temperature sensor can be positioned on a printed circuit board of the air conditioning device. Alternatively, the temperature sensor can also be arranged on the fan housing in the air intake region or in the inlet flow region of the air routing body. On the basis of the detected air temperature and taking into account the air delivery volume, which is set by the control electronics, the heating power of the temperature-control device can be set so that a constant temperature of the ejected air is achieved. By using preheated drawn-in air, energy-efficient operation of the air conditioning device is possible due to the energy recuperation implemented with a lower temperature difference between the drawn-in air and the outlet air.

The object on which the invention is based is further achieved by a support device of the type mentioned at the outset, wherein the air conditioning device of the support device according to the invention is designed according to one of the embodiments described above. With regard to the advantages and modifications of the support device according to the invention, reference is first made to the advantages and modifications of the air conditioning device according to the invention.

In the support device according to the invention, pre-temperature-controlled air is drawn in, which, for example, accumulates in the neck region of a seat user. Through the design of the air conditioning device, the outflow angle of the temperature-controlled air is spread out or widened, so that the outflow region of the temperature-controlled air covers the entire neck region. Due to the drawing-in of pre-temperature-controlled air, the air conditioning device can also be operated extremely energy-efficiently, since the temperature adjustment to be implemented is reduced.

In a preferred embodiment, the support device according to the invention is designed as a headrest for a vehicle seat. Alternatively, the support device according to the invention can also be designed as a backrest for a vehicle seat. The at least one air inlet opening and/or the at least one air outlet opening of the air conditioning device are preferably positioned in a neck region of the support device and/or arranged such that the temperature-controlled air flow is ejected into a neck region of the seat user.

In another preferred embodiment of the support device according to the invention, the at least one air inlet opening and/or the at least one air outlet opening of the air conditioning device are at least partially surrounded by the support surface of the support body or integrated into the support surface of the support body. The at least one air inlet opening and/or the at least one air outlet opening can be covered by an air-permeable seat cover. The air-permeable seat cover can act as a filter, so that contamination of the air conditioning device is avoided.

The object on which the invention is based is further achieved by a vehicle seat of the type mentioned at the outset, wherein the support device of the vehicle seat according to the invention is designed according to one of the embodiments described above. With regard to the advantages and modifications of the vehicle seat according to the invention, reference is made to the advantages and modifications of the air conditioning device according to the invention and to the advantages and modifications of the support device according to the invention.

BRIEF DESCRIPTION OF THE FIGURES

Preferred embodiments of the invention are explained and described in more detail below with reference to the accompanying drawings. Shown are.

DETAILED DESCRIPTION

Figure 1:
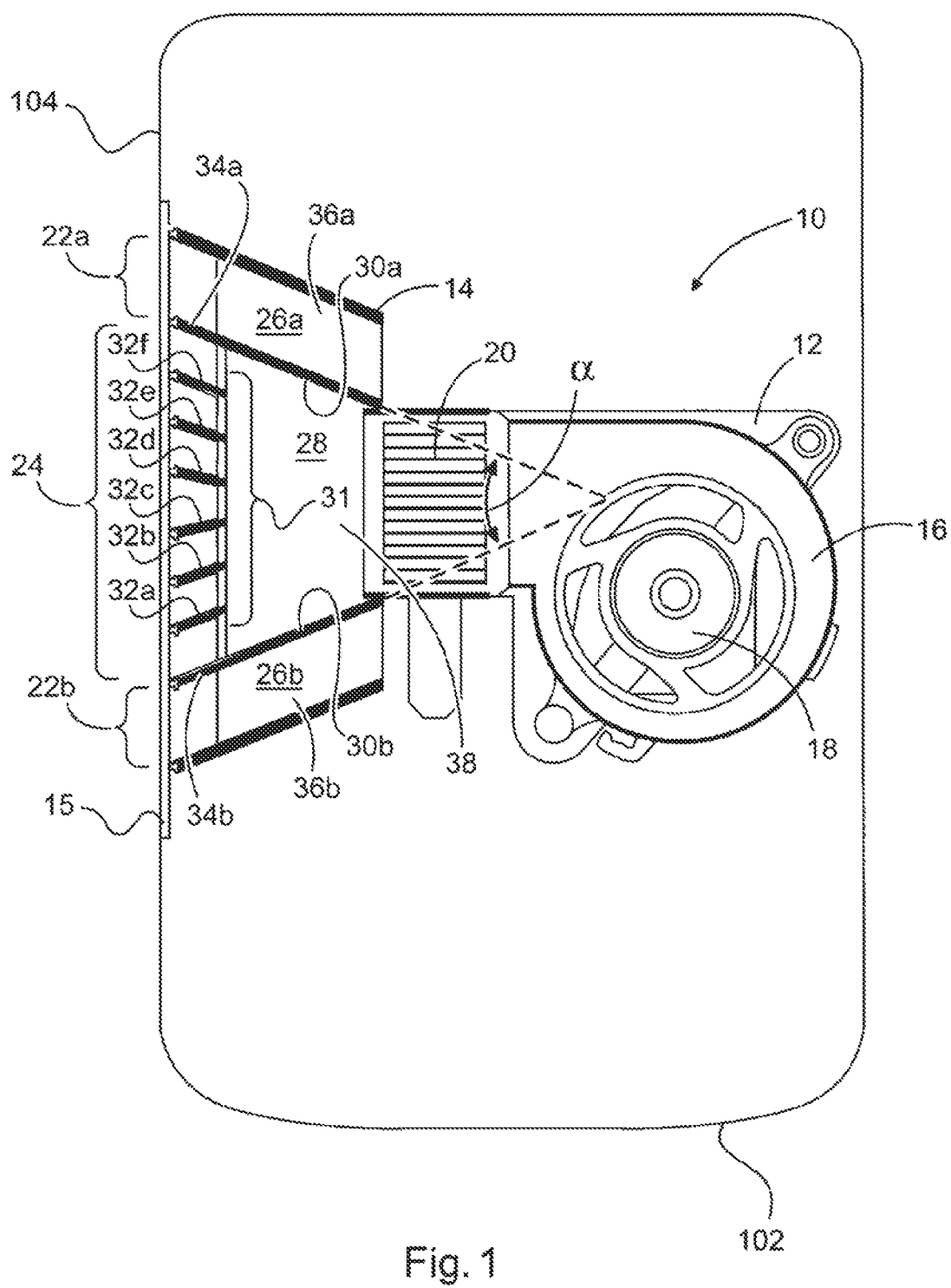
FIG. 1 an embodiment of the air conditioning device according to the invention in a sectional view.

FIG. 1 shows an air conditioning device 10 which can be used for temperature control of an air flow and which can be used in a vehicle seat.

The air conditioning device 10 comprises a fan unit 12, which is connected to an air routing body 14 in a reversible and non-destructive detachable manner. The air routing body 14 is plugged onto a fan housing 16 of the fan unit 12.

A flow generator 18 and a temperature-control device 20 are arranged inside the fan housing 16 made of plastic. The flow generator 18 is designed as a radial fan and is used for generating an air flow. The temperature-control device 20 comprises one or more electrical heating elements, such as PTC heating elements. The temperature-control device 20 is used for temperature control, for example, for heating or cooling, of the air flow generated by the flow generator 18. The air flow to be temperature-controlled is guided past the temperature-control device 20 so that a corresponding heat exchange can take place.

The air routing body 14 has two lateral air inlet openings 22a, 22b and an air outlet opening 24 arranged between the air inlet openings 22a, 22b. The air inlet openings 22a, 22b serve to draw in air to be temperature-controlled. The air inlet openings 22a, 22b are fluidically connected to a flow inlet of the flow generator 18. The air outlet opening 24 is used to eject temperature-controlled air. The air outlet opening 24 is fluidically connected to a flow outlet of the flow generator 18. The temperature-control device 20 is consequently configured to control the temperature of the air drawn in through the air inlet openings 22a, 22b prior to the ejection thereof through the air outlet opening 24. The air inlet openings 22a, 22b and the air outlet opening 24 are arranged directly next to one another. The air inlet openings 22a, 22b and the air outlet opening 24 form a common air passage opening.

Because the air inlet openings 22a, 22b and the air outlet opening 24 are arranged directly next to one another, the air drawn in through the air inlet openings 22a, 22b is already pre-temperature-controlled, since it is drawn in from a temperature-control region into which the temperature-controlled air is ejected through the air outlet opening 24. The temperature control region can be, for example, the neck region of a vehicle seat user. In the neck region of the vehicle seat user, heat accumulates due to the continuous ejecting of temperature-controlled air, so that the air drawn in by the air conditioning device 10 is already pre-temperature-controlled.

The air inlet openings 22a, 22b are each directly adjoined by an inlet flow region 26a, 26b, wherein the inlet flow regions 26a, 26b are formed separately from an outlet flow region 28, to which the air outlet opening 24 directly adjoins.

An exchange of fluid between the air flow to be temperature-controlled and the temperature-controlled air flow within the air conditioning device 10 is avoided in this way. Furthermore, the heat exchange between the air flow to be temperature-controlled and the temperature-controlled air flow within the air conditioning device 10 is reduced.

The outlet flow region 28 is delimited by lateral wall surfaces 30a, 30b, wherein the lateral wall surfaces 30a, 30b are supported by separating lamellae 34a, 34b. The wall surfaces 30a, 30b are arranged opposite one another and diverge in the flow direction of the temperature-controlled air. The wall surfaces 30a, 30b run such that a spread angle α is formed between the wall surfaces 30a, 30b. The spread angle α can be between 40 and 55 degrees depending on the embodiment of the air routing body 14. Due to the diverging lateral wall surfaces 30a, 30b, the outlet flow region 28 has a free flow cross-section that increases in the flow direction of the temperature-controlled air. Furthermore, a guide grille body 31 is arranged in the outlet flow region 28 in the vicinity of the air outlet opening 24. The guide grille body 31 comprises a plurality of air guide elements arranged in a fan-like manner and designed as air guide blades 32a-32f. The air guide blades 32a-32f each have a orientation that deviates from the others.

The air routing body 14 of the air conditioning device 10 has inlet flow channels 36a, 36b in the inlet flow regions 26a, 26b, which channels fluidically connect the air inlet openings 22a, 22b to the flow generator 18. In the embodiment shown, additional air guidance through the object in which the air conditioning device 10 is inserted is required so that the inlet flow channels 36a, 36b are connected to the flow inlet of the flow generator 18. The flow generator 18 and the air outlet opening 24 of the air routing body 14 are connected via an outlet flow channel 38. The inlet flow channel 36a and the outlet flow channel 38 are formed adjacent to one another and separated from one another by the separating lamellae 34a. The inlet flow channel 36b and the outlet flow channel 38 are arranged adjacent to one another and separated from one another by the separating lamellae 34b.

The air routing body 14 is connected to a support surface 104 of a support body 102 via a screen 15 which encloses the air inlet openings 22a, 22b and the air outlet opening 24. The support body 102 is an upholstery unit of a headrest, wherein the air routing body 14 and the guide grille body 31 are integrated into the front shell of the headrest.

Figure 2:
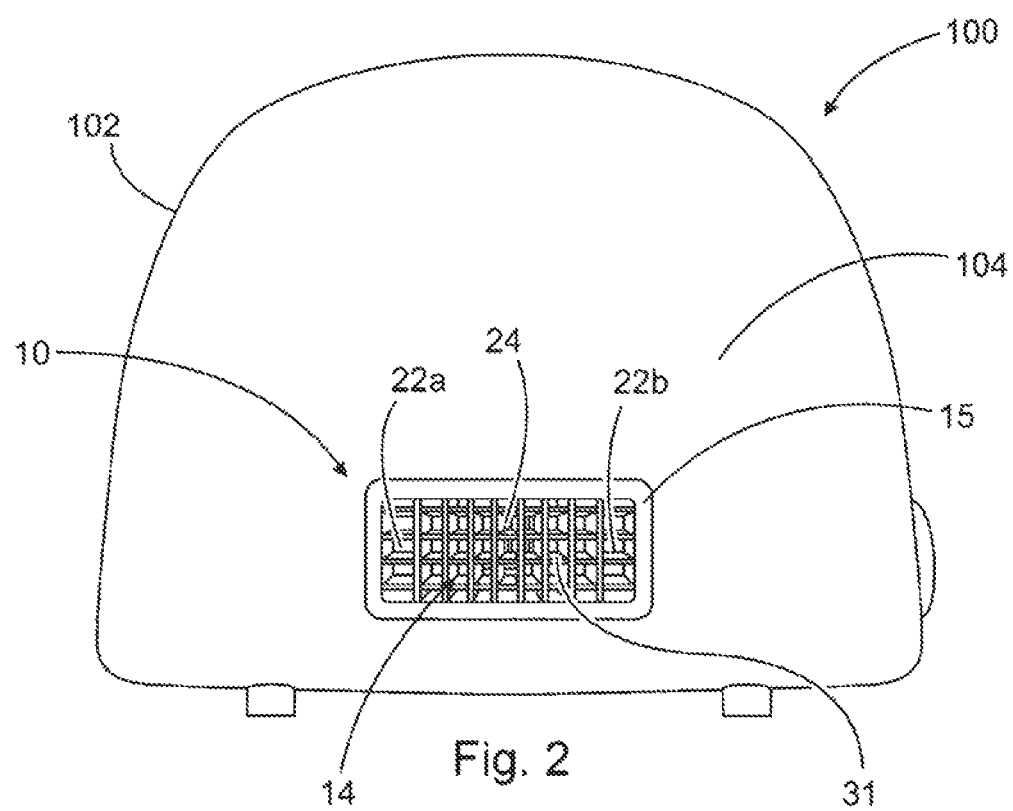
FIG. 2 an embodiment of the support device according to the invention in a front view.

FIG. 2 shows that the air routing body 14 has an air passage opening which is enclosed by the screen 15 and which comprises both the air inlet openings 22a, 22b and the air outlet opening 24. The air passage opening is thus a combined air inlet and air outlet opening.

The one-piece air routing body 14 and the fan unit 12 of the air conditioning device 10 are arranged within a support body 102 of a support device 100. The support device 100 is designed as a headrest for a vehicle seat. The support body 102 is padded and has a support surface 104 for the back of the head of a user. When using the support device 100 designed as a headrest, the air inlet openings 22a, 22b and the air outlet opening 24 are arranged in the vicinity of the neck of the user of the vehicle seat. The air inlet openings 22a, 22b and the air outlet opening 24 are surrounded by the support surface 104 of the support body 102.

Due to the arrangement of the air conditioning device 10 within a support device 100 designed as a headrest, pre-heated air which accumulates in the neck region can be drawn in. The temperature control of preheated air can be done much faster and more energy-efficiently than the temperature control of non-preheated ambient air. Due to the construction of the air routing body 14, the temperature-controlled air is ejected in a spread out or widened outflow cone, so that temperature control of the entire neck region of the user can be implemented.

The air inlet openings 22a, 22b and the air outlet opening 24 are arranged next to one another such that when the air conditioning device 10 is in operation outside the air conditioning device 10 in the transition region between the air inlet openings 22a, 22b and the air outlet opening 24, air turbulences are formed, which deflect the ejected air through the air outlet opening 24 to the outside. The air turbulence thus increases the outflow cone of the temperature-controlled air again. This ultimately leads to an increase in the effective temperature control range, which can be used to warm the neck.

Figure 3:
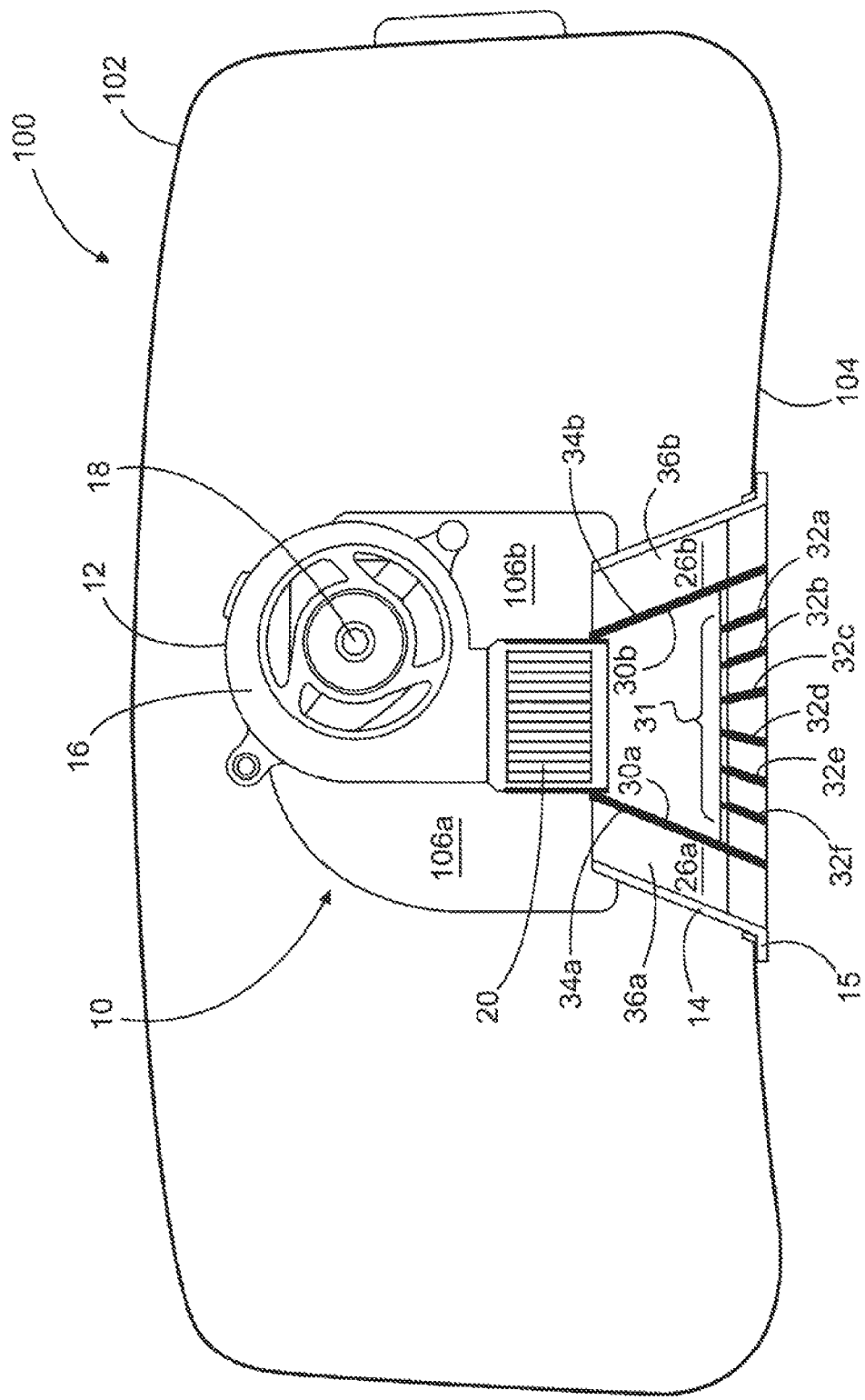
FIG. 3 the support device shown in FIG. 2 in a sectional view from above.

FIG. 3 shows an air conditioning device 10 which is integrated into a support device 100 designed as a headrest. In this embodiment, the air routing body 14, the screen 15 and the guide grille body 31 are designed as integral components of a one-piece plastic body. The introduction of the drawn-in air into the flow generator 18 via the inlet flow regions 26a, 26b of the air routing body 14 and the flow channels 106a, 106b adjoining the inlet flow regions 26a, 26b is also illustrated. The flow channels 106a, 106b are at least partially formed by internal structures of the support body 102. The internal structures of the support body 102 can comprise air guide elements which, in combination with the fan housing 16 of the fan unit 12, form the flow channels 106a, 106b.

As an alternative to the arrangement in a headrest, the air conditioning device 10 can also be integrated into a backrest of a vehicle seat. In this case, the support surface 104 would serve to support the back and preferably the back of the head of a user.

Figure 4:
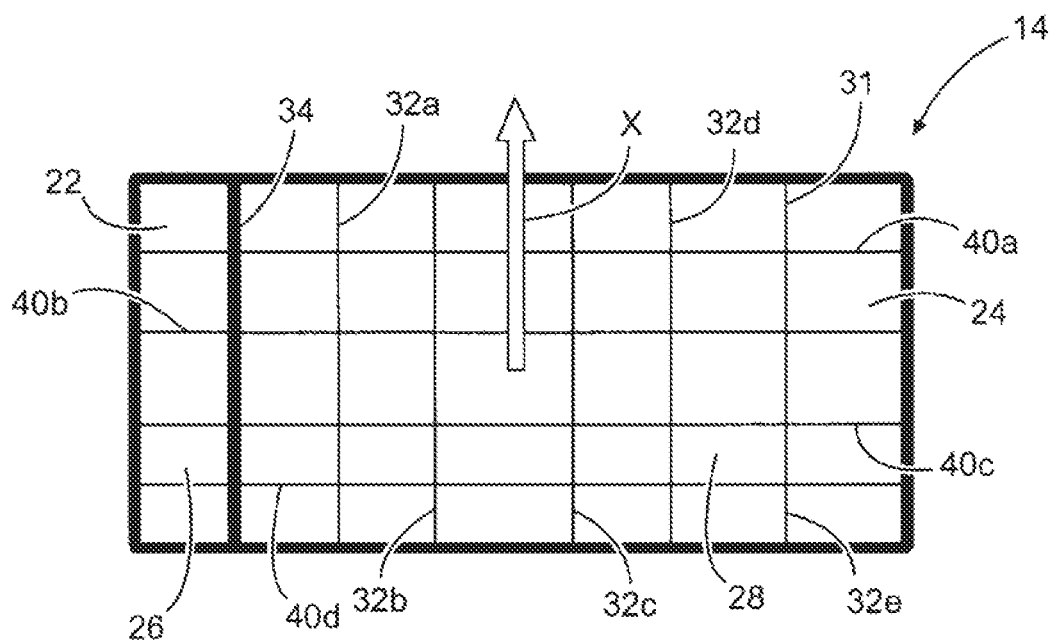
FIG. 4 an air routing body of an air conditioning device according to the invention in a front view.

FIG. 4 shows an air routing body 14 having only one air inlet opening 22 and only one air outlet opening 24. The air inlet opening 22 and the air outlet opening 24 are arranged next to one another in the horizontal direction. The air inlet opening 22 has a significantly smaller opening area than the air outlet opening 24. The inlet flow region 26 and the outlet flow region 28 in the interior of the air routing body 14 are separated from one another by the upright separating lamellae 34. A plurality of air guide blades 32a-32e, 40a-40d of a guide grille body 31 extend through the inlet flow region 26 and the outlet flow region 28. The air guide blades 40a-40d run in the horizontal direction both through the inlet flow region 26 and through the outlet flow region 28 and are lined-up such that the ejected, temperature-controlled air flow follows the outlet flow direction x. The air guide blades 32a-32e stand upright in the outlet flow region 28 and are lined-up such that the temperature-controlled air flow spreads out laterally after leaving the air routing body 14, so that a flow cone that increases with increasing distance from the air routing body 14 is created. In the embodiment shown, the air inlet opening 22 and the inlet flow region 26 are arranged to the left of the air outlet opening 24 and the outlet flow region 28, respectively. Alternatively, the air inlet opening 22 and the inlet flow region 26 can also be arranged to the right of the air outlet opening 24 and the outlet flow region 28, respectively.

Figure 5:
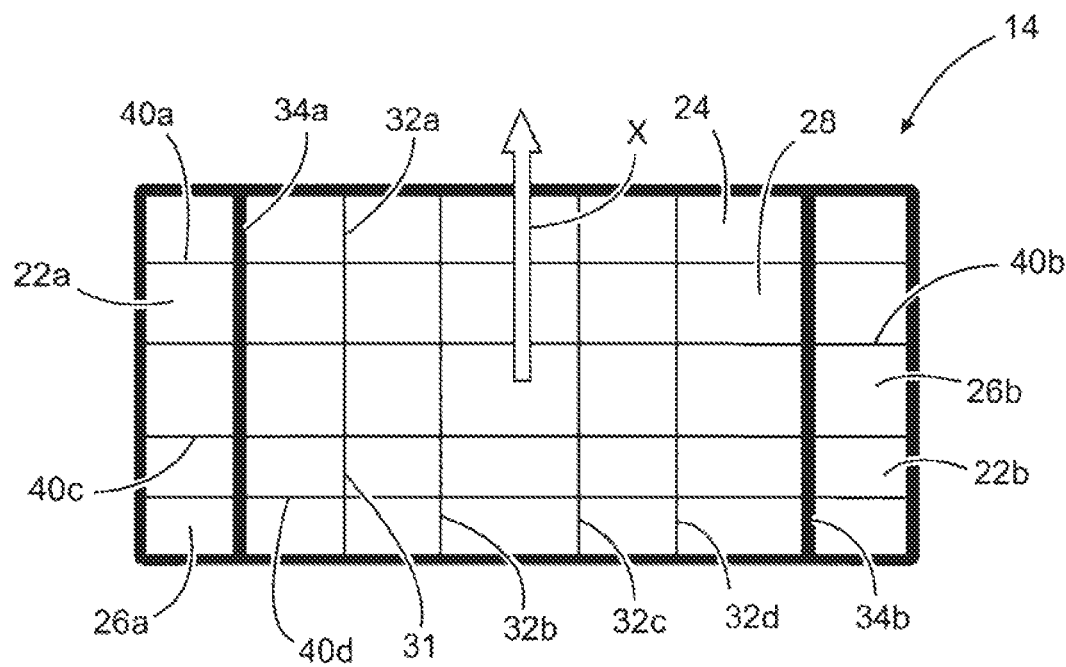
FIG. 5 an air routing body of a further air conditioning device according to the invention in a front view.

FIG. 5 shows an air routing body 14 having two air inlet openings 22a, 22b and only one air outlet opening 24. The air inlet openings 22a, 22b are arranged on opposite sides of the air outlet opening 24. The air outlet opening 24 is thus arranged between the air inlet openings 22a, 22b. The air inlet openings 22a, 22b have a significantly smaller opening area than the air outlet opening 24. The inlet flow regions 26a, 26b and the outlet flow region 28 in the interior of the air routing body 14 are separated from one another by the upright separating lamellae 34a, 34b. A plurality of air guide blades 32a-32d, 40a-40d of a guide grille body 31 extend through the inlet flow regions 26a, 26b and the outlet flow region 28. The air guide blades 40a-40d run in the horizontal direction both through the inlet flow regions 26a, 26b and through the outlet flow region 28 and are lined up such that the ejected, temperature-controlled air flow follows the outlet flow direction x. The air guide blades 32a-32d stand upright in the outlet flow region 28 and are lined up such that the temperature-controlled air flow spreads out laterally after leaving the air routing body 14, so that a flow cone that increases with increasing distance from the air routing body 14 is created.

Figure 6:
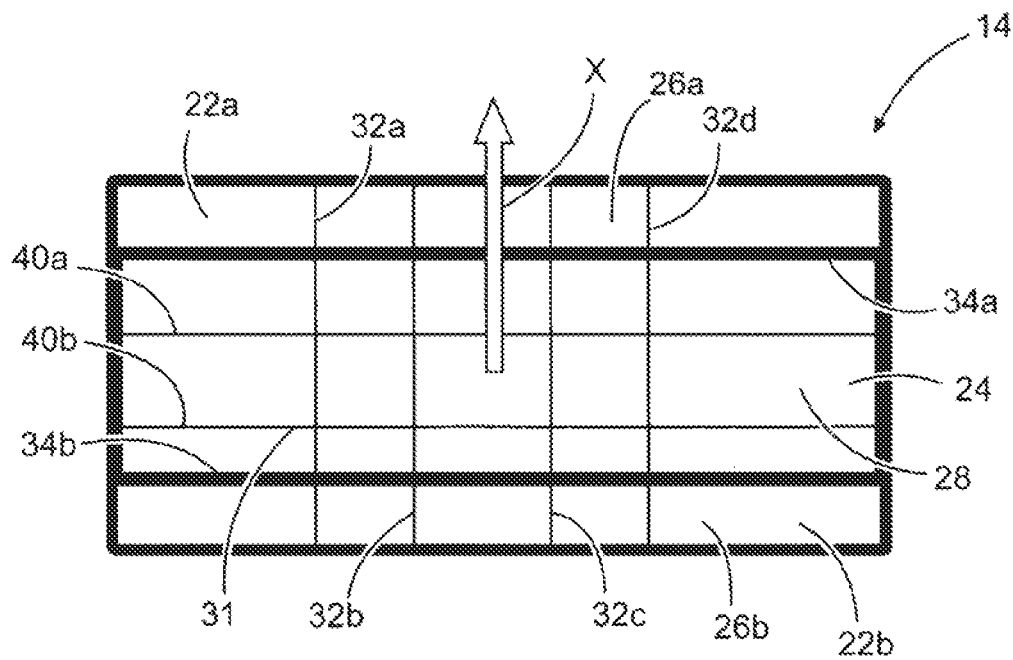
FIG. 6 an air routing body of a further air conditioning device according to the invention in a front view.

FIG. 6 shows an air routing body 14 in which the air inlet openings 22a, 22b and the inlet flow regions 26a, 26b are not arranged laterally next to the air outlet opening 24 or the outlet flow region 28, as in FIG. 5, but rather above and below the air outlet opening 24 and the outlet flow region 28, respectively.

Figure 7:
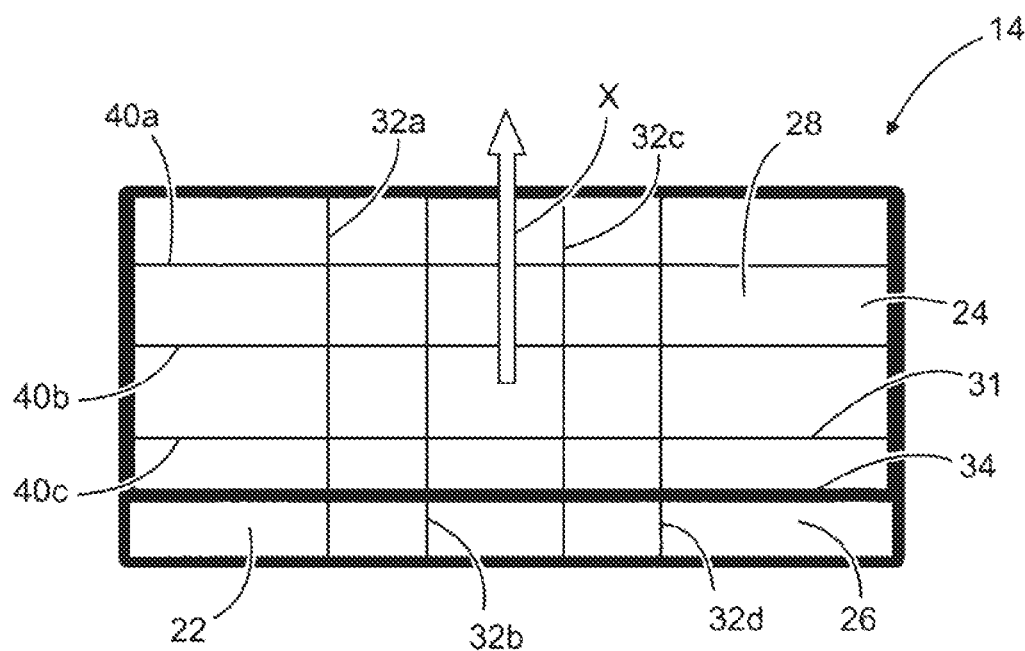
FIG. 7 an air routing body of a further air conditioning device according to the invention in a front view.

FIG. 7 shows an air routing body 14 in which the air inlet opening 22 and the inlet flow region 26 are not arranged laterally next to the air outlet opening 24 or the outlet flow region 28, as in FIG. 4, but rather below the air outlet opening 24 and the outlet flow region 28, respectively. Alternatively, the air inlet opening 22 and the inlet flow region 26 can also be arranged above the air outlet opening 24 and the outlet flow region 28, respectively.

REFERENCE NUMBERS 10 air conditioning device
12 fan unit
14 air routing bodies
15 screen
16 fan housing
18 flow generator
20 temperature-control device
22, 22a, 22b air inlet openings
24 air outlet opening
26, 26a, 26b inlet flow regions
28 outlet flow region
30a, 30b wall surfaces
31 guide grille body
32a-32f air guide blades
34, 34a, 34b separating lamellae
36a, 36b inlet flow channels
38 outlet flow channel
40a-40d air guide blades
100 support device
102 support body
104 support surface
106a, 106b flow channels
α spread angle
x outlet flow direction

The invention claimed is:

1. An air conditioning device for a vehicle seat, the air conditioning device comprising:
   at least one flow generator configured to generate an air flow;
   at least one air inlet opening fluidically connected to a flow inlet of the at least one flow generator to draw in air to be temperature-controlled;

at least one air outlet opening fluidically connected to a flow outlet of the at least one flow generator to eject the temperature-controlled air;

a temperature-control device configured to control a temperature of the air prior to the air being ejected from the at least one air outlet opening; and a temperature sensor configured to detect a temperature of the air that is drawn into the at least one air inlet opening and/or the at least one flow generator, and a heating power of the temperature-control device is controlled based on the detected temperature of the air drawn into the at least one air inlet opening and/or the at least one flow generator.

2. The air conditioning device according to claim 1, wherein the air conditioning device comprises a one-piece, air routing body comprising the at least one air inlet opening and the at least one air outlet opening.

3. The air conditioning device according to claim 1, wherein the at least one air inlet opening and the at least one air outlet opening form a common air passage opening.

4. The air conditioning device according to claim 1, wherein an inlet flow region directly adjoining the at least one air inlet opening runs separately from an outlet flow region to which the at least one air outlet opening adjoins directly, and optionally the outlet flow region has a free flow cross-section, which increases in a flow direction of the temperature-controlled air.

5. The air conditioning device according to claim 1, wherein the flow outlet is a channel defined by a pair of opposing diverging walls that diverge in an outflow direction of the temperature-controlled air, and the flow inlet is a channel that is defined by a pair of walls, which extend at least partially alongside the temperature control device to the inlet of the at least one flow generator.

6. The air conditioning device according to claim 4, wherein the outlet flow region is arranged between two inlet flow regions.

7. The air conditioning device according to claim 2, wherein the air conditioning device comprises a guide grille body, which has a plurality of air guide elements which form a lattice structure and are configured to influence a flow direction of the air flow within the air routing body and/or the flow direction of the air flow out of the air routing body.

8. The air conditioning device according to claim 7, wherein the guide grille body is arranged in an outlet flow region and/or in an inlet flow region and in a vicinity of the at least one air outlet opening and/or the at least one air inlet opening, wherein the air guide elements are fan-like arranged air guide blades.

9. The air conditioning device according to claim 1, wherein the at least one air inlet opening and the at least one flow generator are connected via one or more inlet flow channels and the at least one flow generator and the at least one air outlet opening are connected via one or more outlet flow channels, wherein the one or more inlet flow channels and tone or more outlet flow channels are formed separately from one another and/or are arranged adjacent to one another.

10. The air conditioning device according to claim 1, wherein the at least one flow generator and the temperature-control device have a common fan housing, wherein the air routing body is fastened to the fan housing.

11. The air conditioning device according to claim 1, wherein the at least one air inlet opening and the at least one air outlet opening are arranged next to one another such that, when the air conditioning device is in operation, outside the air conditioning device in a transition region between the at least one air inlet opening and the at least one air outlet opening, an air turbulence forms which deflects the air ejected through the at least one air outlet opening to the outside.

12. A support device comprising:

a support body which has a support surface for a back and/or a back of a head of a user; and the air conditioning device according to claim 1, to draw in, control the temperature of and eject the air flow, the air conditioning device being arranged within the support body.

13. The support device according to claim 12, wherein the at least one air inlet opening and/or the at least one air outlet opening of the air conditioning device are at least partially surrounded by the support surface of the support body or are integrated into the support surface of the support body, wherein the support device is a headrest or a backrest of the vehicle seat.

14. The air conditioning device according to claim 5, wherein the pair of opposing diverging walls of the flow outlet channel are arranged at a spread angle to one another, the spread angle having a vertex that is offset from a rotational axis of the at least one flow generator.

15. The air conditioning device according to claim 5, wherein the pair of walls of the flow inlet channel extend at least partially alongside and past the temperature control device to the inlet of the at least one flow generator.

16. The air conditioning device according to claim 15, wherein one of the pair of walls of the flow inlet channel directly adjoins one wall of the pair of opposing diverging walls of the flow outlet channel, a cross section of the inlet flow channel is generally constant, and the inlet flow channel has a substantially linear extension.

* * * * *